A. STEMPEL.
Stretcher-Frames for Pictures.

No. 150,982. Patented May 19, 1874.

ATTEST:
INVENTOR:

UNITED STATES PATENT OFFICE.

ADOLPH STEMPEL, OF CHICAGO, ILLINOIS.

IMPROVEMENT IN STRETCHER-FRAMES FOR PICTURES.

Specification forming part of Letters Patent No. 150,982, dated May 19, 1874; application filed November 24, 1873.

*To all whom it may concern:*

Be it known that I, ADOLPH STEMPEL, of Chicago, in the county of Cook and State of Illinois, have invented an Improvement in Stretcher-Frames, of which the following is a specification:

The nature of this invention relates to an improvement in the manufacture of stretcher-frames, such as are used for mounting pictures, lithographs, and show-cards. Heretofore it has been the custom to join the ends and sides of said frames, by forming a tongue or tenon on the end of piece and inserting it in a slot or mortise in the other, and securing the joint by pins or glue, or both, making such joints very weak by cutting away so much of the material. The object of this invention is to so form the joints at the corners of the stretchers as to give them much greater strength than could be secured in the ordinary way, while the cost of manufacture is also lessened.

Figure 1:
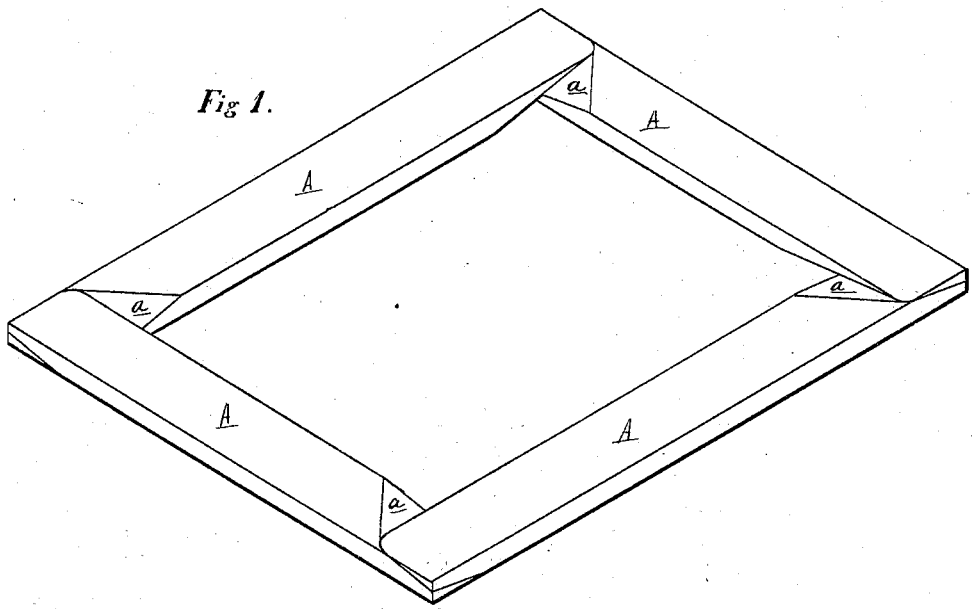
Figure 2:
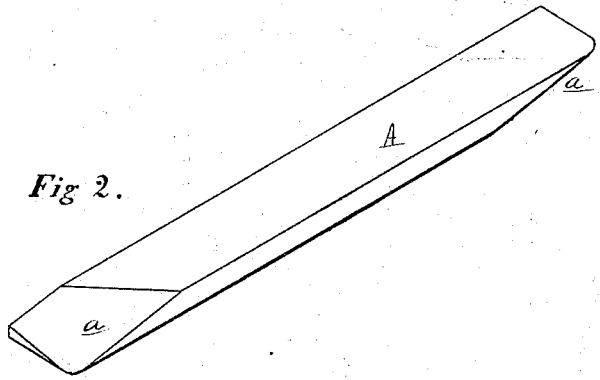

Figure 1 is a perspective view of my improved stretcher. Fig. 2 is a similar view of one of the pieces, showing the manner of shaping the ends to form a joint.

In the drawing, A represents the wooden bar or slat, four of which are used to form the stretcher-frame. On one end of each slat I cut, by means of a suitable machine, a sloping bevel face, *a*, running down to a knife-edge at the outer corner. A similar bevel face is cut at the other end of the piece, also running down at the outer corner to a knife-edge. Now, if two such slats are glued together at their ends, at right angles to each other, their surfaces will be flush, as seen in Fig. 1, while it is also evident that such a joint will cost less than a mortise and tenon, and it will be much stronger.

What I claim as my invention, and desire to secure by Letters Patent, is—

As a new article of manufacture, a stretcher-frame composed of slats or bars A, having their ends cut to the sloping bevels *d*, to form the corner-joints, substantially as described.

ADOLPH STEMPEL.

Witnesses:
 WM. H. LOTZ,
 H. BISCHOFF.